United States Patent [19]

Risinger

[11] 3,775,256

[45] Nov. 27, 1973

[54] ANAEROBIC BACTERIA LABORATORY

[76] Inventor: Max K. Risinger, 2716 Harrington Dr., Decatur, Ga. 30033

[22] Filed: Oct. 14, 1971

[21] Appl. No.: 189,435

[52] U.S. Cl................... 195/108, 23/281, 195/109, 195/127
[51] Int. Cl............................................. C12b 1/00
[58] Field of Search................... 195/104, 108, 109, 195/126, 127, 139, 142, 144; 23/281; 21/58; 99/189, 154

[56] References Cited
UNITED STATES PATENTS
3,519,398  7/1970  Roberts................................. 23/281

*Primary Examiner*—A. Louis Monacell
*Assistant Examiner*—Robert J. Warden
*Attorney*—Harold D. Jones, Jr. et al.

[57] ABSTRACT

Apparatus for receiving and examining anaerobic bacteria. The apparatus provides separate anaerobic areas for culture work or study, for culture incubation, and for refrigerated culture storage. The atmosphere within the apparatus is recirculated for conditioning, including $O_2$ removal by passage through oxygen adsorption material which can be purged to expel oxygen removed from the anaerobic atmosphere.

12 Claims, 7 Drawing Figures

PATENTED NOV 27 1973 3,775,256

PATENTED NOV 27 1973 3,775,256

ANAEROBIC BACTERIA LABORATORY

This invention relates in general to controlled atmosphere apparatus and in particular to controlled atmosphere apparatus usable for the study and examination of anaerobic bacteria.

The class of bacteria known as anaerobes or anaerobic bacteria are important in the study of medicine and other scientific fields. The study and use of anaerobic bacteria is greatly complicated, however, by the well-known fact that oxygen is lethal to the anaerobes. For example, it has been substantiated that many medically important anaerobes cannot withstand more than 20 minutes exposure to the ambient atmosphere; some anaerobes, such as the methanogenic bacteria, are killed almost instantly upon exposure to the atmosphere.

It is evident that a substantially oxygen-free environment must be provided for the study and culturing of anaerobic bacteria. While such devices such as the Brewer jar and the Torbal jar have been used in attempts to provide deoxygenated atmospheres for the study and culture of anaerobic bacteria, such prior art devices have a number of disadvantages. Prior techniques for the removal of oxygen have involved techniques such as combustion, chemical absorption of the oxygen, or the displacement of oxygen-containing air with an inert gas such as nitrogen. These techniques, along with the prior art apparatus for their practice, have typically been slow, cumbersome, and have provided a final atmosphere the oxygen content of which is poorly controllable and of unknown composition. More importantly, none of these prior techniques permit one to work with anaerobic organisms with the same degree of facility as he would work with an anaerobe.

Accordingly, it is an object of the present invention to provide improved anaerobic bacteria culture apparatus.

It is another object of the present invention to provide anaerobic bacterial culture apparatus which does not require the removal of air and the substitution of an inert atmosphere.

It is still another object of the present invention to provide unitary anaerobic bacteria culture apparatus capable of accomplishing bacteria culture, bacteria incubation, and refrigerated bacteria storage of anaerobic bacteria.

It is a further object of the present invention to provide anaerobic bacteria culture apparatus including deoxygenation of the anaerobic atmosphere.

It is yet a further object of the present invention to provide a bacteria manipulation loop capable of being heat-sterilized in an atmosphere devoid of oxygen.

Many of the other objects and attendant advantages of the present invention will become more readily apparent from an examination of the disclosed embodiment including the drawing, in which.

Figure 1:
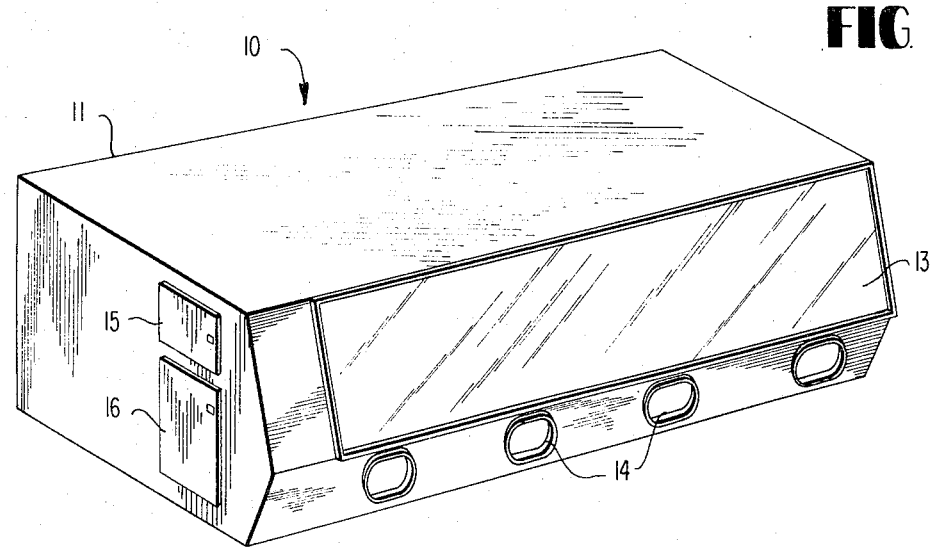
FIG. 1 shows a pictorial view of an embodiment of the present invention.

Stated generally, the present invention provides an anaerobic bacteria culture apparatus which combines an anaerobic work area, incubator, and refrigerated zone in a unitary structure having glove ports and air locks to permit air-free access to the working areas of the apparatus, and additionally provides treatment of the recirculating atmosphere to remove oxygen therefrom.

More specifically, the disclosed embodiment of the present invention as shown in the figures includes anaerobic bacteria culture apparatus shown generally at 10 and including an outer housing 11 having a transparent window 13 disposed along the front of the housing. One or more glove ports 14 are provided along the front of the housing beneath the windows 13 to receive gloves (not shown) which enable a worker to manipulate objects within the apparatus. The windows 13 are mounted in the housing 10 with suitable gaskets or the like to provide an airtight fit. A pair of air lock doors 15 and 16 are provided at one end of the apparatus to permit controlled access to the interior thereof.

Figure 2:
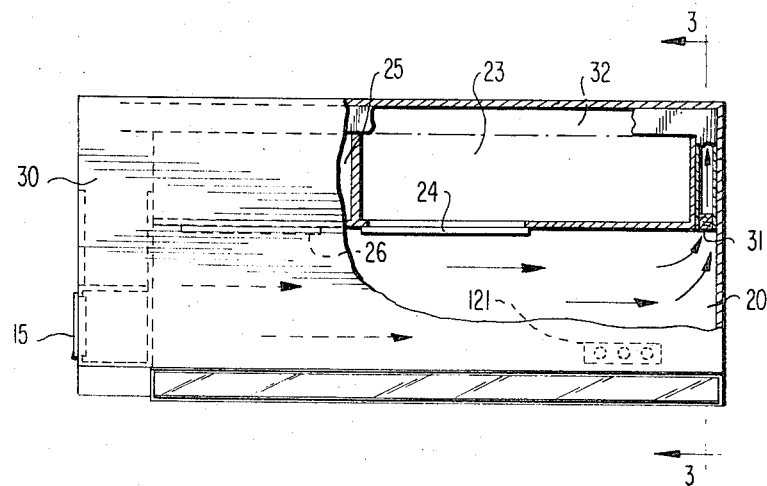
FIG. 2 shows a top plan view, partially broken away, of the disclosed embodiment.
Figure 3:
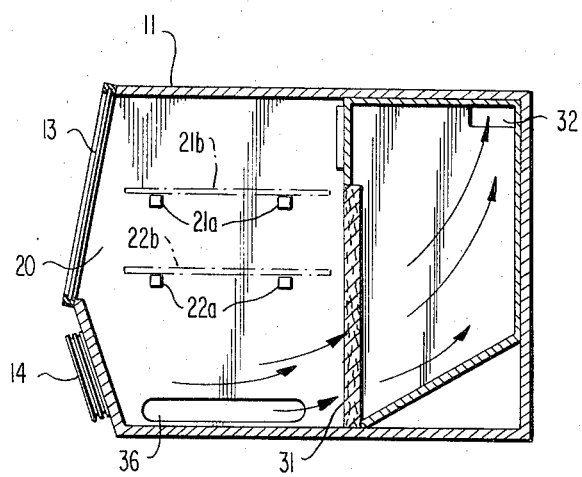
FIG. 3 shows a section view of the disclosed embodiment taken along line 3—3 of FIG. 2.

Looking next to the interior of the depicted embodiment as best shown in FIGS. 2 and 3, the interior portion which is accessible and viewable from the window 13 comprises a work zone 20 including shelf supports 21a and 22a appropriately disposed to receive corresponding shelves 22b and 22b. A second zone 23 is positioned within the upper interior portion of the apparatus and is provided with an access door 24 to enable the second zone to be sealed off from the work zone 20. The second zone 23 may comprise an incubation zone to enable anaerobic bacteria cultures to incubate undisturbed by other work being performed in the work zone 20.

A refrigerated zone 25 is positioned adjacent the second or incubation zone 23. Access to the refrigerated zone 25 from the work zone 20 is obtained through the door 26.

Constant movement of laminar air flow is maintained through the work zone 20 with a suitable blower or fan mechanism 53 which may be located in the atmospheric control zone 30. Air moves under the influence of the blower 53 through one or more suitable apertures 36 into the work zone 20 in the direction shown by the arrows in FIG. 2. The laminar air flow moves across the work zone 20 substantially from the left side of the zone to the right side thereof, as viewed in FIG. 2, and then passes through a suitable material 31 for absorbing $H_2S$ from the atmosphere, such absorbent material being known to those skilled in the art. The air next passes into a duct 32 which serves as an air return to the atmospheric control zone 30.

The apparatus for refrigerating the zone 25 may be disposed in any suitable location in the apparatus 10.

Figure 4:
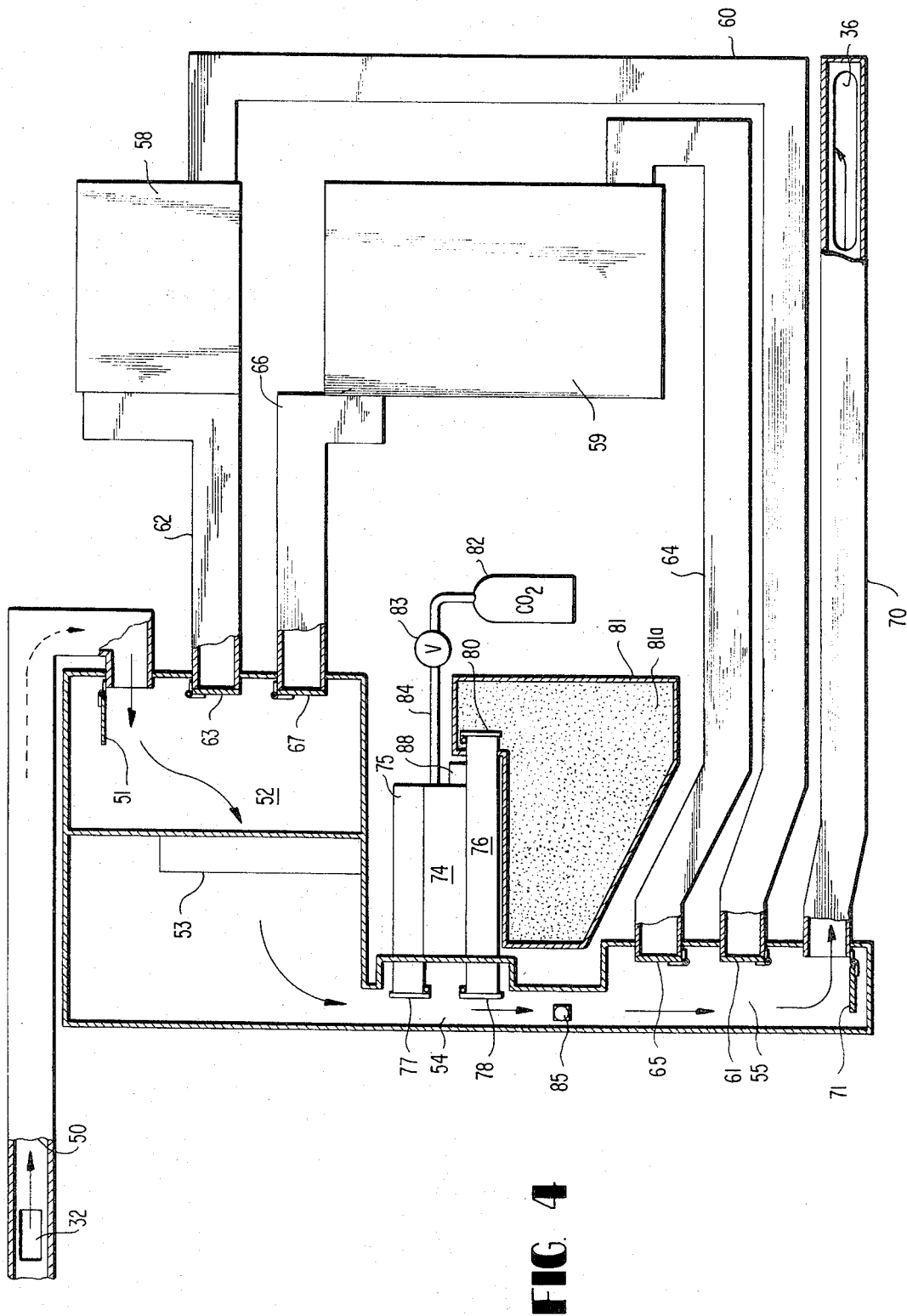
FIG. 4 shows a partially schematic view of the atmosphere control apparatus of the embodiment of FIG. 1.

The atmosphere control zone 30, which may be positioned at the left end of the apparatus 10 as viewed in FIGS. 1 and 2, is shown in operative detail in FIG. 4 and includes the aforementioned blower or fan mechanism 53 as well as an oxygen analyzer, deoxygenation apparatus, and atmosphere flow control devices. Atmosphere returned from the work zone 20 through the duct 32 flows through a channel 50 and a normally-open valve 51 to first plenum 52 under the influence of a fan or blower mechanism 53. An air control passageway 54 is provided communicating with the outlet or exhaust of the fan 53 and with a second plenum 55.

Each of the two air locks 58 and 59 is selectively connectable to be placed in flow communication with the atmospheric control zone. The air lock 58 is accessible from outside the apparatus 10 by means of the air lock door 15, depicted in FIG. 1, while the air lock 59 similarly is accessible by means of the air lock door 16. It will be understood that each of the air locks 58 and 59 has a separate inner door (not shown) openable from within the work zone 20 in a manner conventional with two-Door air lock design. The air lock 58 is sized appropriately to permit entry of items such as culture tubes or the like, and permits anaerobes to be rapidly inserted into the apparatus since the smaller volume of the air lock 58 enables this air lock to become deoxygenated more rapidly, as pointed out below, than the larger air lock 59, which provides adequate space for the entry of equipment such as test tube racks, Petri dishes, and the like.

Air flow to the air lock 58 is selectively established through a supply duct 60 communicating with the plenum 55 through a normally-closed valve 61. The air flow from the air lock 58 is provided through a duct 62 and a normally-closed valve 63 communicating with the plenum 52. In a similar manner, the larger air lock 59 is selectively supplied with atmosphere flow through a duct 64 and a normally-closed valve 65, while a return flow from the air lock 59 occurs through a duct 66 and a normally-closed valve 67. Recirculated atmosphere is returned to the work zone 20 through a duct 70 establishing communication between the plenum 55, through a normally-open valve 71, and the aperture 36.

Deoxygenation of the atmosphere within the present apparatus is accomplished and maintained with a suitable deoxygenating composition received within a receptacle 74 in communication with an inlet zone 75 and an outlet zone 76. Selective communication with the deoxygenating receptacle is provided with normally-closed air valves 77 and 78. The deoxygenating composition contained within the receptacle 74 preferably is a material which exhibits a reversible property of deoxygenation. One such composition which is effective with the present apparatus is cobalt-di (3-fluorosalicylaldehyde) ethylenediimine, which is obtainable in the form of porous crystals and which adsorbs oxygen from an oxygen-containing atmosphere passing thereover or therethrough. The aforementioned composition provides a reversibly catalytic oxygen removable effect in that the oxygen adsorbed by the composition can be substantially or completely purged or removed from the composition by heating the composition at an elevated temperature, for example, near the boiling point of water, after which the composition is again available for deoxygenation. Since the deoxygenating material in the receptacle 74 may eventually require replacement, it is advisable to construct the receptacle 74 in the form of a cartridge member which can be conveniently removed and replaced with respect to the inlet zone 75 and the outlet zone 76.

A second normally-closed valve 80 communicates with the outlet zone 76 and a chamber 81 containing a suitable material 81a such as sodium thiosulfite which may have a non-reversible oxygen absorption property. A supply of gaseous carbon dioxide 82 is selectively connected through a valve 83 and a conduit 84 with the deoxygenation receptacle 74 for a purpose to be pointed out below.

In considering the operation of the atmospheric control apparatus described thus far, it is initially assumed that the atmosphere within the laboratory has already been deoxygenated by the atmospheric control apparatus and is simply being recirculated. In this case, all of the flow valves depicted in FIG. 4 assume their normal positions as shown therein; the atmosphere returning from the laboratory through the duct 32 and channel 50 is drawn through the open valve 51 by the fan 53, and then is forced along the control passageway 54 to flow over an oxygen analyzer probe 85. Since it is assumed that the oxygen content of the atmosphere is at an acceptably low level, flow continues into the plenum 55, through the open valve 71 and the duct 70, and is returned through the aperture 36 into the work zone 20 for recirculation.

If the oxygen analyzer 85 detects an oxygen concentration in excess of a predetermined amount, for example, in excess of 3 parts per million (ppm), both of the valves 77 and 78 will be opened to accomplish the dual functions of blocking further direct flow of the atmosphere through the atmosphere control passageway 54 and causing the atmosphere to flow instead into the inlet zone 75, through the deoxygenation receptacle 74 to pass over the deoxygenation composition for oxygen removal, and thence into the outlet zone 76 to be returned through the now-open valve 78 into the atmosphere control passageway for return of the now-deoxygenated atmosphere to the work zone 20. The foregoing deoxygenating process continues until the oxygen analyzer probe 85 indicates that the oxygen content of the atmosphere has been reduced to an acceptable level such as 1 ppm. When this occurs, the valves 77 and 78 are returned to their normally-closed positions to restore the normal operation of the apparatus.

At this time it becomes necessary to remove the adsorbed oxygen from the composition in the receptacle 74. A receptacle heater 88 is actuated to elevate the temperature of the deoxygenation composition. When the temperature of the composition reaches a predetermined temperature, for example 100° C. for the specific composition mentioned above, gaseous oxygen is evolved from the composition and flows through the now-open valve 80 to the chamber 81 to be absorbed by the material 81a therein. The material 81a may be periodically replaced in routine maintenance of the laboratory apparatus. The operation of the heater 88 is controlled by a timer so that the oxygen absorption composition in the receptacle 74 is heated for a predetermined interval, such as, for example, 3 minutes. At the end of this interval, the heater is de-energized and the valve 83 is momentarily actuated to cause carbon dioxide to flow over the deoxygenating composition in the receptacle 74, thereby to reduce the temperature of this composition and also to flush any residual gaseous oxygen from the composition through the open valve 80 and into the chamber 81. The valve 80 is then returned to its normally-closed position and the deoxygenation composition in 74 is now available for another deoxygenation cycle.

During removal of oxygen from the anaerobic atmosphere by passage through the composition in the receptacle 74, the oxygen adsorption process may produce unwanted heating of the anaerobic atmosphere through an exothermic reaction. Moreover, such oxygen removal may reduce the pressure of the atmosphere within the present apparatus to below a desired level. This is overcome by selectively opening the valve 83 to permit carbon dioxide to flow into the receptacle 74 to reduce the temperature of the deoxygenation material and to provide an anerobic make-up gas for restoring the desired pressure of the atmosphere within the apparatus.

When one or the other of the air locks, for example, the air lock 58, is used to introduce an object to the anaerobic atmosphere within the laboratory, the outer door 15, for example, associated with that air lock is opened, the object is inserted within the air lock, and the outer door is again closed. It will be understood that the interior of the air lock as well as the object placed therein contains oxygen which must be removed before the inner door (not shown) of the air lock is opened to enable the object to be withdrawn from the air lock and received within the laboratory. Referring again to FIG. 4, this oxygen removal is accomplished by opening the valves 61 and 63 respectively associated with the atmosphere inlet to and the outlet from the air lock 58. At the same time, the valves 77 and 78 are opened to block the normal flow of atmosphere through the control passageway 54 and the valves 51 and 71 are closed to temporarily terminate the recirculation of the atmosphere through the work zone 20. It can be seen that the oxygen-containing atmosphere within the air lock 58 is withdrawn through the duct 62 and the now-open valve 63 by the fan 53 and is then forced through the open valve 77, the deoxygenation composition contained in the receptacle 74, and is then returned through the open valve 78 and the open valve 61 to the air lock 58 by way of the duct 60. This process continues until the oxygen analyzer probe 85 indicates that the atmosphere within the air lock 58 has been sufficiently deoxygenated, at which time the valves 63 and 61 are closed to terminate recirculation through the air lock and the valves 51, 71, 77, and 78 revert to the normal positions to reestablish atmosphere recirculation through the work zone 20. The deoxygenation composition within the receptacle 74 then undergoes an oxygen purging cycle as described above. At this time the inner door to the air lock 58 may be opened and the article therein removed and positioned within the work zone 20 or the like.

The operation of the air lock 59 for introduction of larger apparatus into the work zone 20 is similar to that described above with respect to the smaller air lock 58, with the difference that the valves 67 and 65 are opened to establish deoxygenation air flow from the air lock 59.

Figure 5:
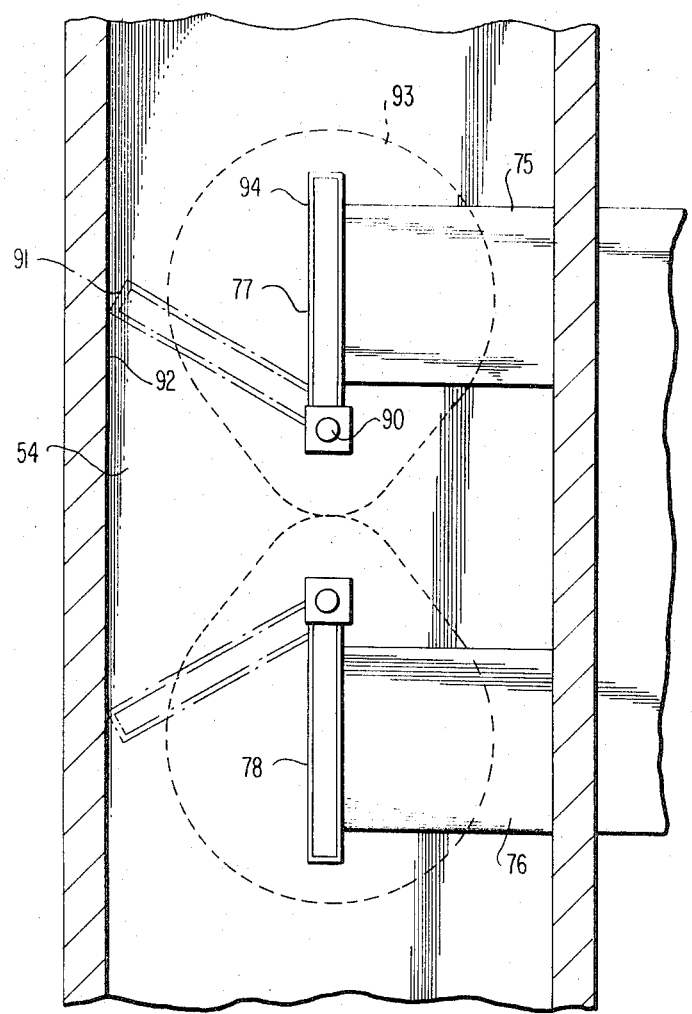
FIG. 5 shows an enlarged view of two of the flow control valves included in FIG. 4.

While the various atmosphere control valves depicted schematically in FIG. 4 may be of any design which accomplishes the desired result of selectively opening or blocking the several air flow passageways, a specific design of the two valves 77 and 78 associated with the atmosphere control passageway 54 is shown in greater detail in FIG. 5. The valve 77, for example, is mounted to pivot about an axis 90 to be moved from its normally-closed position, in which the valve completely blocks air flow into the inlet zone 75, to an open position shown in phantom in FIG. 5, wherein the outer edge 91 of the valve 77 engages the wall 92 of the passageway 54. Each of the valves 77 and 78 preferably is in the form of a rectangular plate having a peripheral gasket along its outer edges, including the edge 91, and dimensioned substantially to correspond with the cross-section of the atmosphere flow region within the passageway 54, so that when the valves 77 and 78 are open to engage the wall 92, the fan-induced atmospheric flow through the passageway 54 is diverted from the normal straight-through direction and instead flows into the inlet zone 75, through the deoxygenation receptacle 74, and returns to the passageway 54 by way of the outlet zone 76.

Each of the valves 77 and 78 as well as the other flow control valves herein, can be operated by a separate drive unit as shown in outline at 93, for example, and which may comprise an electric motor connected to the valve axis 90 through a suitable reduction gear drive. The various valves are retained in their normal positions by a torsion spring or another suitable biasing member, and the valves are moved to their respective non-normal positions in opposition to the spring bias through action of the drive unit 93. Such drive units may advantageously be motors which are designed for a duty cycle which includes power-on stall operation, so that the valve member is operated to its non-normal position by the motor in opposition to the spring restoring force and is then maintained in that position by the torque of the stalled motor until such time as power is removed from the motor to permit the spring restoring force to return the valve member to its normal position.

Figure 6:
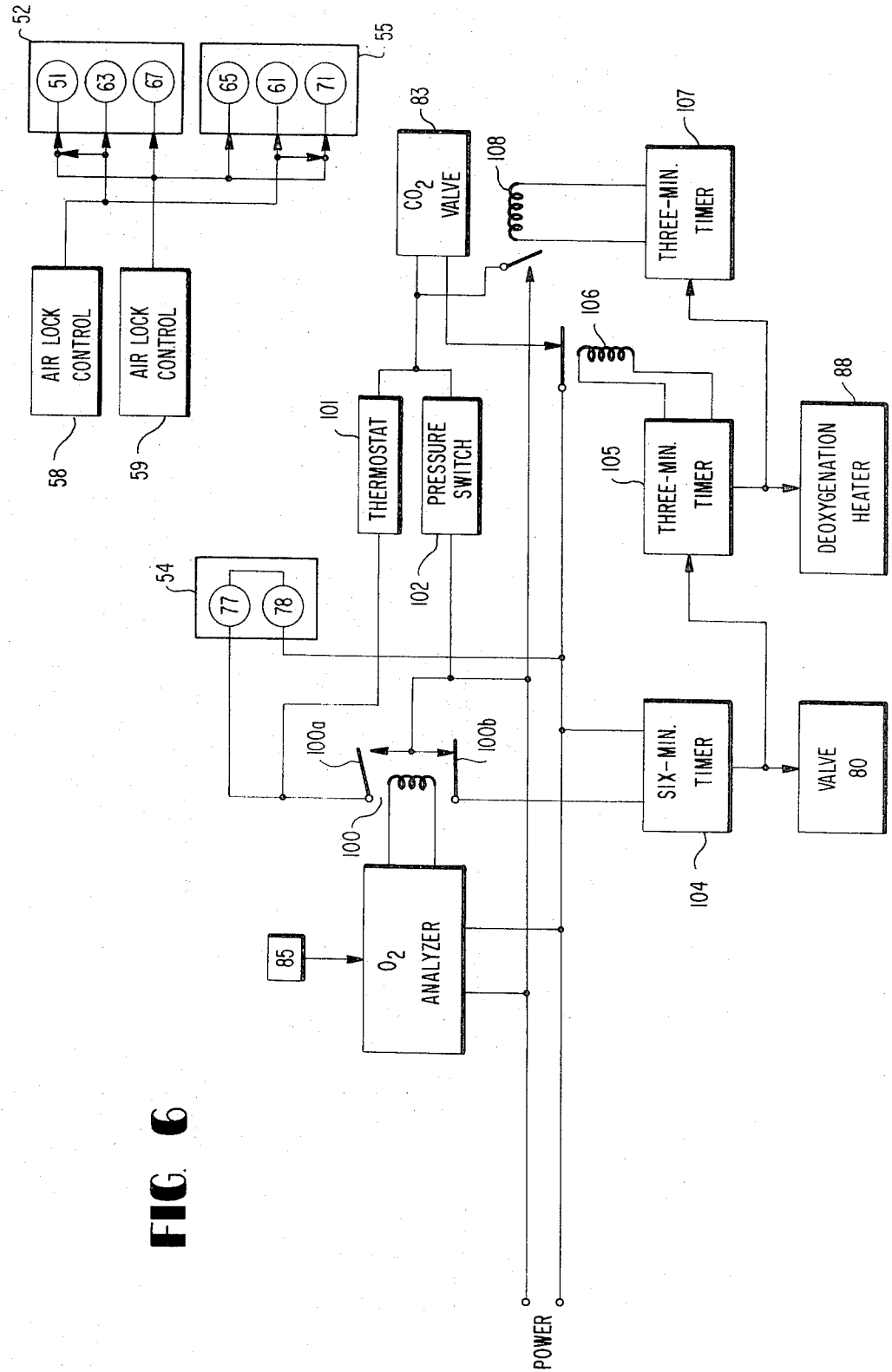
FIG. 6 shows a functional schematic control circuit of the described embodiment.

The above-described operational aspects for the disclosed embodiment of the present invention may be observed with respect to the functional schematic shown in FIG. 6. The oxygen analysis probe 85 is connected to a suitable oxygen analyzer which is set to detect a predetermined maximum level of oxygen concentration as discussed above. When the predetermined concentration of oxygen is exceeded, power is applied to the relay 100 to close the normally-open contact 100a and to open the normally-closed contact 100b. The energized relay 100 thus applies power to the series-connected motors for actuating the valves 77 and 78 located in the control passageway 54, thus diverting atmosphere flow through the receptacle 74. The temperature of the deoxygenation composition may be maintained at a desired maximum level, such as 25° C., during the exothermic deoxygenation operation by means of the thermostat 101 connected to control the operation of the carbon dioxide valve 83. The valve 83 is also operable by the control pressure switch 102 which energized the valve when the pressure of the atmosphere in the vicinity of the receptacle 74 falls below a predetermined minimum. It will be apparent that both the thermostat 101 and the pressure switch 102 advantageously are positioned to be responsive to the temperature and pressure respectively of the atmosphere in the vicinity of the deoxygenation receptacle 74.

When the oxygen content of the atmosphere has been reduced to an acceptable level as determined by the oxygen analyzer, power is removed from the relay 100 and the relay contacts 100a and 100b revert to the normal positions as shown in FIG. 6 to remove power from the motors controlling the valves 77 and 78. These valves then close to permit direct flow to be reestablished through the passageway 54. At the same time, power is applied through contact 100b to a 6-minute timer 104 to commence the oxygen-purge cycle of the deoxygenating composition. The valve 80 is immediately energized by the 6-minute timer 104 to be held open, and the 6-minute timer also energizes a 3-minute timer 105 which applies power to the deoxygenation heater 88 for a period of 3 minutes. The 3-minute timer 105 also opens normally-closed relay 106 for 3 minutes to prevent the carbon dioxide valve from functioning.

When the 3-minute timer 105 times out, power is removed from the relay 106 and from the heater 88. The time-out of timer 105 also initiates the operation of the 3-minute timer 107 to close normally-open relay 108 for a 3-minute period to establish a flow of carbon dioxide to flush any remaining gaseous oxygen from the deoxygenation composition and also to reudce the temperature of the composition. When the 3-minute timer 107 times out, the relay 108 is de-energized to permit the valve 83 to close. At this time, the 6-minute timer 104 also times out and causes power to be removed from the valve 80, whereupon this valve resumes its normally-closed position. The oxygen purge cycle thus is completed and the atmospheric control apparatus again continues to monitor atmosphere flow to detect an excess concentration of oxygen.

The flow control valves 51, 53, and 57, positioned in the plenum 52, and the flow control valves 65, 61, and 71, positioned in the plenum 55, are functionally shown on FIG. 6 in combination with controls for the air lock 58 and the air lock 59. When the air lock 58 control is energized, for example, the valves 51, 63, 65, and 71 are energized to depart from their respective normal positions, thus closing the work zone 20 from recirculation and commencing deoxygenation of the atmosphere in the air lock 58. In a similar manner, actuation of the air lock control 59 energizes the valves 51, 67, 65, and 71 to commence deoxygenation of that air lock and also to seal off the work zone 20 from atmosphere recirculation. It will be understood, of course, that the respective inner and outer doors of the two air locks advantageously may be equipped with appropriate latching devices and interlocks which prevent the untimely opening of these doors during the deoxygenation cycles of the air locks and at other times. The details of such latching devices and interlocks are well within the skill of the art and are not depicted herein.

Figure 7:
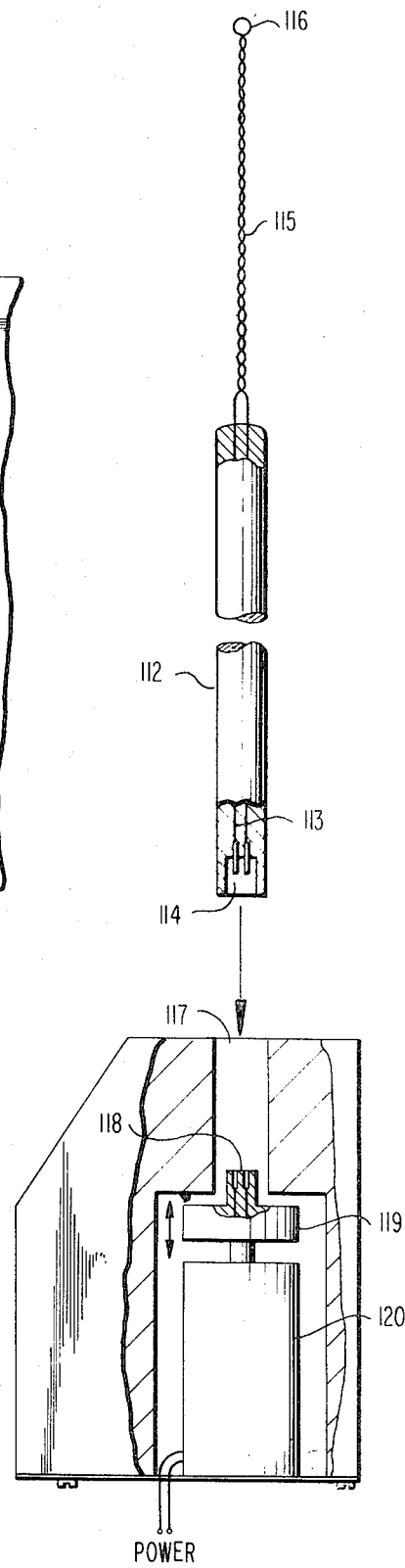
FIG. 7 shows an embodiment of a sterilizable culture sample apparatus.

A person working with anaerobic bacteria in a laboratory as disclosed herein or in any other anaerobic environment frequently needs culture handling devices such aS a loop or the like for manipulating culture samples. After a loop has been exposed to a particular culture sample, it is necessary for the loop to be sterilized before the loop can be used to handle another sample without risking contamination. While such sterilization typically has been accomplished by subjecting the loop to heat from a Bunson burner flame, this expedient is obviously impossible in an environment containing substantially no oxygen. This problem is overcome with the self-sterilizing loop apparatus shown in FIG. 7 and including a loop handle 112 made of a suitable electrically insulating and heat-resistant material, such as Teflon or the like, and having a pair of electrical conductors 113 extending therethrough to terminate at one end with a pair of contact pins 114. The other ends of the conductors 113 terminate in a resistance wire 115 having a suitable culture-manipulating loop 116 formed at its outer end.

The pin end of the handle 113 is dimensioned to be received in a receptacle 117 having at its inner end a mating pair of electrical pin sockets 118 which are mounted on a reciprocable member 119, the motion of which is controlled by the circuit breaking mechanism 120. When the handle 112 is inserted in the receptacle 117 so that the pins 114 engage the corresponding pin sockets 118, and is further depressed so that the reciprocable member 119 moves downwardly, an electrical circuit is established through a suitable power source and the circuit breaking mechanism 120 which may include operative elements of a conventional circuit breaker. The reciprocable member 119 is temporarily latched in a lowered position by the circuit breaking mechanism 120 and current flow is established through the conductors 113, the resistance wire 115, and the loop 116. This wire is heated to a temperature which causes the loop 116 to become sterilized. At the same time, current flowing through the circuit breaker mechanism 120 causes this mechanism to unlatch after the passage of an interval of time such as twelve seconds, for example, whereupon the electrical circuit to the pin sockets 118 is interrupted and the reciprocable member 119 is raised to indicated that the sterilization procedure is completed.

Since a user of the apparatus typically will require at least one loop apparatus for use while another such apparatus is being sterilized, a block 121 having a plurality of sterilizing receptacles 117 may be provided in the work zone 20 along with a corresponding number of loop apparatus.

While this invention has been described in detail with particular reference to preferred embodiments thereof, it will be understood that variations and modifications can be effected within the spirit and scope of the invention as described hereinbefore and as defined in the appended claims.

What is claimed is:

1. The process for establishing and maintaining a deoxygenated atmosphere suitable for anaerobic bacteria, comprising the steps of:
   defining a region which is isolated from oxygen-containing atmosphere;
   recirculating the atmosphere contained within the isolated region through a flow circuit which excludes oxygen removing means;
   measuring the oxygen content of the recirculating atmosphere to detect the presence of a predetermined excess concentration of oxygen; and
   in response to the measured presence of said predetermined excess concentration of oxygen, introducing the recirculating atmosphere into oxygen deleting communication with a means which removes oxygen from the atmosphere.

2. The process for establishing and maintaining a deoxygenated atmosphere suitable for anaerobic bacteria, comprising the steps of:
   defining a region which is isolated from oxygen-containing atmosphere;
   recirculating the atmosphere contained within the isolated region through a flow circuit which excludes oxygen removing means;
   measuring the oxygen content of the recirculating atmosphere to detect the presence of a predetermined excess concentration of oxygen;
   in response to the measured presence of said predetermined excess concentration of oxygen, introducing the recirculating atmosphere into oxygen deleting communication with a means which removes oxygen from the atmosphere; and withdrawing the oxygen removing means from oxygen deleting communication with the recirculating atmosphere when the measured oxygen content of the recirculating atmosphere has been reduced to a predetermined desirable concentration.

3. The process of claim 2, further comprising the step of removing at least a portion of the deleted oxygen from the oxygen removing means subsequent to said withdrawal of the oxygen removing means from oxygen deleting communication with the recirculating atmosphere.

4. The process as in claim 2, wherein said step of introducing comprises passing the isolated atmosphere in oxygen adsorption communication with cobalt-di-(3fluorosalicyladehyde) ethylenediimine.

5. The process for establishing and maintaining a deoxygenated atmosphere suitable for anaerobic bacteria, comprising the steps of:
  defining a region which is isolated from oxygen-containing atmosphere;
  recirculating the atmosphere contained within the isolated region;
  measuring the oxygen content of the recirculating atmosphere to detect the presence of an excess concentration of oxygen;
  in response to the measured presence of an excess concentration of oxygen, introducing the recirculating atmosphere into oxygen deleting communication with a means which removes oxygen from the atmosphere;
  measuring the pressure of the recirculating atmosphere placed in said oxygen deleting communication to detect the presence of atmospheric pressure which is lower than a predetermined value; and
  adding to the recirculating atmosphere in response to atmospheric pressure lower than said predetermined value a quantity of anaerobic gas to supplement said atmospheric pressure.

6. Apparatus for providing a substantially deoxygenated environment, comprising:
  housing means defining a region which is isolated with respect to the surrounding ambient atmosphere;
  atmosphere flow recirculating means in flow communication with said isolated region to withdraw the atmosphere from a first location of said region and to recirculate the atmosphere to a second location of said region;
  oxygen responsive means operative to measure the concentration of oxygen in the recirculating atmosphere;
  deoxygenation means selectively operative for flow communication with the atmosphere in said flow recirculating means; and
  control means responsive to the oxygen concentration measured by said oxygen responsive means and operative to establish said flow communication of said deoxygenation means in response to the measured oxygen concentration exceeding a first predetermined concentration and operative to terminate said flow communication in response to the measured oxygen concentration becoming less than a second predetermined concentration.

7. Apparatus as in claim 6, wherein, said atmosphere flow recirculating means is operative in response to the measured oxygen concentration exceeding said first predetermined concentration of oxygen to place all of the recirculating flow into said deoxygenation communication and is operative in response to the measured oxygen concentration becoming less than said second predetermined concentration of oxygen to completely terminate the flow communication with said deoxygenation means.

8. Apparatus as in claim 7, wherein:
  said deoxygenation means includes removed oxygen purge means selectively oeprative in response to said termination of flow communication with said deoxygenation means to purge the oxygen which said deoxygenation means has removed from the recirculating flow atmosphere.

9. Apparatus as in claim 8, wherein:
  said deoxygenation means comprises means operative to adsorb oxygen from the recirculating flow atmosphere and to evolve the adsorbed oxygen upon being heated;
  said purge means comprises heating means operative while said deoxygenation flow communication is terminated to apply oxygen evolving heat to said oxygen adsorbing means; and
  evolved oxygen removal means operative to remove said evolved oxygen from said oxygen adsorbing means.

10. Apparatus as in claim 8, further comprising means to selectively direct a quantity of anaerobic gas onto said deoxygenation means in response to the atmospheric pressure of the recirculating flow passing therealong becoming less than a predetermined quantity.

11. Apparatus as in claim 6, further comprising:
  air lock means disposed between said defined isolated region and the surrounding ambient environment and having door means to selectively enable communication between the air lock means and either the surrounding ambient environment or said isolated region;
  said atmosphere flow means including flow control means selectively operative to terminate said recirculating flow of the atmosphere in said isolated region and to establish closed circuit recirculation of the atmosphere in said air lock means with said deoxygenation means.

12. Apparatus as in claim 6, further comprising:
  specimen handling means receivable within said isolated region and having a specimen loop made of electrical resistance material and including a handle means having disposed therein first contact means in electrical communication with said specimen loop;
  means disposed within said isolated region and having a receptacle to receive said handle means;
  reciprocable means disposed in said receptacle and having second contact means to establish electrical circuit with said first contact means;
  said reciprocable means being retainably movable to a first position within said receptacle to apply electrical power to said second contact means and thus to said specimen loop and additionally to apply electrical power to a circuit breaking means;
  said circuit breaking means being operative in response to electrical current passing therethrough to enable said reciprocable means to move from said first position to a second position wherein electrical power is removed from said second contact means and from said circuit breaking means.

* * * * *